United States Patent Office 3,356,722
Patented Dec. 5, 1967

3,356,722
PRODUCTION OF DICARBOXYLIC ACIDS
FROM CYCLIC KETONES
Thomas J. Wallace, Elizabeth, and Alan Schriesheim,
Berkeley Heights, N.J., assignors to Esso Research and
Engineering Company, a corporation of Delaware
No Drawing. Filed June 10, 1963, Ser. No. 286,516
7 Claims. (Cl. 260—537)

This invention concerns a novel process for the conversion of cyclic ketones to dicarboxylic acids. The invention is concerned with the base catalyzed oxidative cleavage of cyclic ketones so as to produce dicarboxylic acids.

The production of carboxylic acids from acyclic ketones has been well developed in the prior art. Among the processes which have been developed are the base catalyzed oxidation of acyclic ketones to produce carboxylic acids. However, cyclic ketones are much more difficult to oxidize and techniques have not heretofore been available to achieve the base catalyzed oxidation of cyclic ketones to carboxylic acids. It is a particular feature of this invention that such oxidation is made feasible by use of the novel base-solvent system to be described. In particular the invention concerns the use of a wide variety of basic materials to catalyze the oxidative cleavage of cyclic ketones to carboxylic acids using certain dipolar aprotic solvents. Preferred solvents for use in the process of this invention include hexamethyl phosphoramide, dimethyl sulfoxide, and diphenyl sulfoxide. The invention is of particular commercial interest, enabling the use of weak and relatively inexpensive bases such as sodium hydroxide, potassium hydroxide, or other of the alkali metal hydroxides. In accordance with this invention, it is possible to obtain high yields of dicarboxylic acid products by the oxidation of $C_4$ to $C_{20}$ cyclic ketones.

The objective of producing dicarboxylic acids from cyclic ketones has not been obtainable heretofore employing base catalyzed oxidation. Attempts to oxidize cyclic ketones such as cyclohexanone with bases such as potassium tertiary butoxide has resulted in oxidation to intermediates of undetermined structure which are not carboxylic acids. The present invention is based on the discovery that the desired oxidation of cyclic ketones can be achieved provided certain specific polar solvents are employed. It is theorized that these solvents are of the nature that premit the statbilization of carbanion intermediates, which are then converted under the reaction conditions to the desired carboxylic acid products.

The solvent to be used in the practice of this invention can be characterized by the following properties:

(1) aprotic
(2) a high dielectric constant in excess of 15 at 25° C.
(3) dipolar
(4) non-hydroxylic In addition, it is necessary that the solvents possess the following characteristics:

(1) the dipolar group must be hydrogen-free, and
(2) the atoms adjacent to the dipolar group must be hydrogen-free These solvents include organic compounds having the following dipolar groups:

(1) a carbonyl, a divalent CO radical;
(2) phosphoryl, a trivalent PO radical;
(3) sulfinyl or sulfoxide, the divalent SO radical;
(4) the sulfonyl or sulfone, the bivalent $SO_2$ radical;
(5) thiocarbonyl, the divalent CS radical; and
(6) imino, the CNH radical.

Examples of the carbonyl type compounds include tetraalkyl substituted ureas, such as tetramethyl urea, substituted acetamides, such as N,N-dimethyl-trimethylacetamide. Compounds having the phosphoryl radical include hexa-substituted phosphoramides, such as hexamethylphosphoramide, tri(ethylene amide) phosphoramide, triphenyl phosphine oxide and hypophosphite esters. The sulfinyl radical compounds include compounds such as diphenylsulfoxide, N,N-dimethyl-benzene sulfinamide, and bisdialkyl amino sulfoxides. Examples of the sulfones are tetramethyl diamino sulfone and N,N-dimethyl-benzenesulfonamide; and an example of compounds having a thiocarbonyl group is alkyl substituted thioureas, such as tetramethyl thiourea. An example of compounds containing the imino grouping is tetramethyl guanidine. The above list of compounds is given by way of example only and is not to be considered exhaustive.

The base employed may be any of a wide variety of materials. The only limitation on this material is that it must have sufficient basicity to abstract a proton from the alpha carbon-hydrogen bond of the ketone to form the carbanion intermediate. Examples of suitable bases include metal hydrides, such as sodium hydrides; metal inorganic amides, such as sodium amide; alkyl and alkaline earth organic amides, such as sodium methyl amide; metal alkoxides, such as sodium methoxide and potassium t-butoxide; and alkali and alkaline earth metal hydroxides, such as sodium hydroxide and cesium hydroxide; and metal alkyls, such as sodium ethyl and butyl lithium. Particularly preferred are bases composed of the heavy alkali metals, e.g., potassium, cesium and rubidium. Furthermore, where the base has an alkyl group, effectiveness is increased by increasing the number of carbon atoms—for example, $KOC_2H_5$ is more effective than $KOCH_3$ and KO-t-butylate is more effective than both. This listing is by way of illustration only. Clearly, other suitable bases are known to those skilled in the art.

The invention is of application to the conversion of the broad class of cyclic ketones containing 4 to 20 carbon atoms. These include cyclobutanone, cyclopentanone, cyclohexanone, cycloheptanone, and so on through the homologous series. It is apparent that the invention can be utilized for similar conversion of cyclic ketones which contain alkyl or aryl substituents positioned on the cycylic ketone ring. Thus the invention may be used for the production of substituted dicarboxylic acids from such substituted cyclic ketones as 4-methylcyclohexanone, 3,4-dimethylcyclopentanone, 4-phenylcyclohexanone, and 3,4-diphenylcyclopentanone or [3.1.1]-bicycloheptane-1-one. In addition, the invention is of application to the conversion of bridged cyclic ketone compounds such as [2.2.1]-bicycloheptane-2-one. For example, cyclopentanone and cyclohexanone in sodium methoxide, hexamethylphosphoramide may be converted to glutaric and adipic acids, respectively by the process of this invention.

It is notable that the ease of oxidation of the cyclic ketones referred to varies inversely with the number of carbon atoms. Thus, for example cyclopentanone can be oxidized to glutaric acid much more easily than cyclododecanone can be oxidized to dodecanedioic acid. It is a particular feature of this invention that higher molecular weight cyclic ketones can be successfully oxidized to a dicarboxylic acid.

More specifically, the present invention is of broad application to the oxidation of monocyclic ketones, bicyclic ketones, tricyclic ketones, benzocyclonones, quinones (diketones), and steroidal ketones. Examples of such oxidations are as follows:
Examples of Bicyclic Ketones:
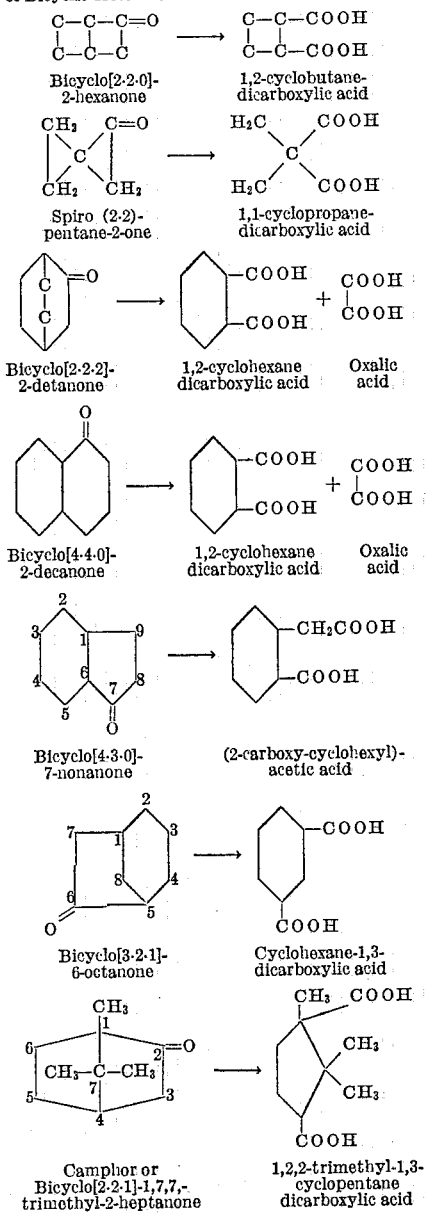
Tricyclic Ketones:
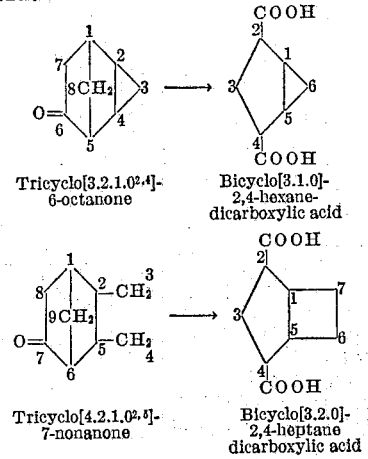
Benzocyclonones:
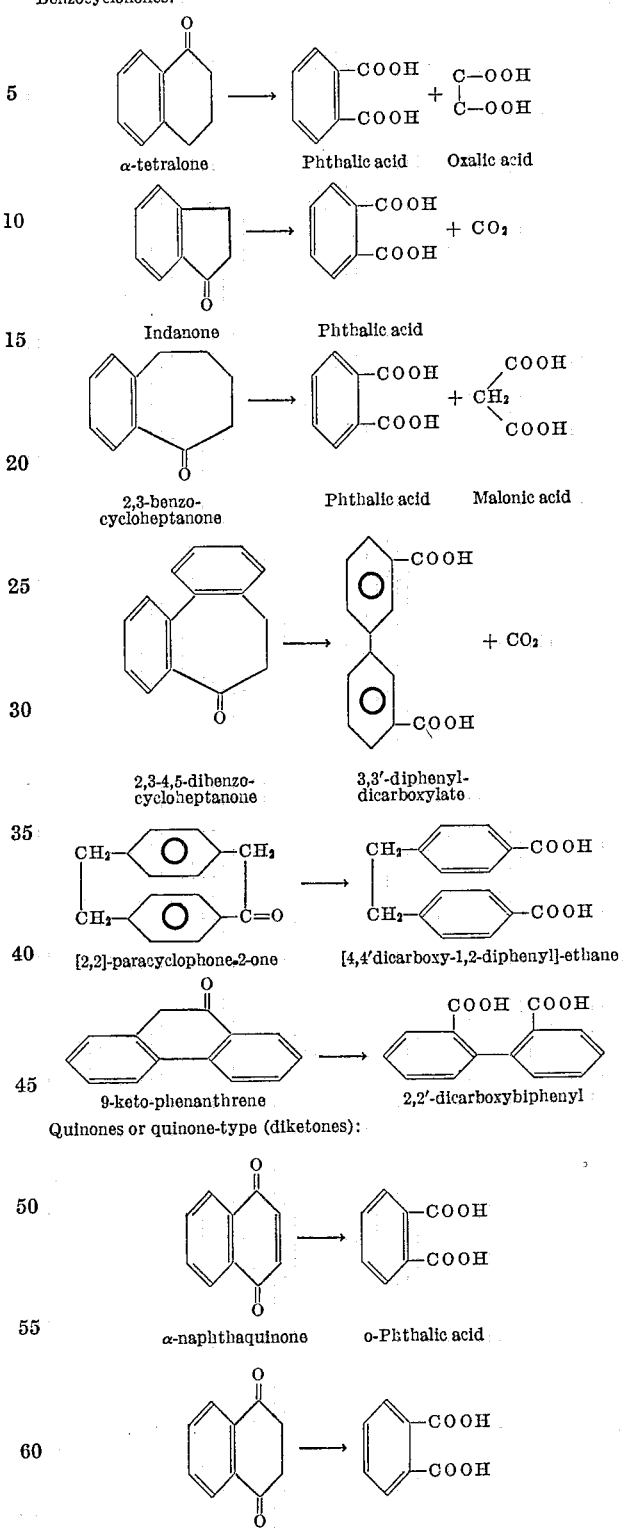
Quinones or quinone-type (diketones):
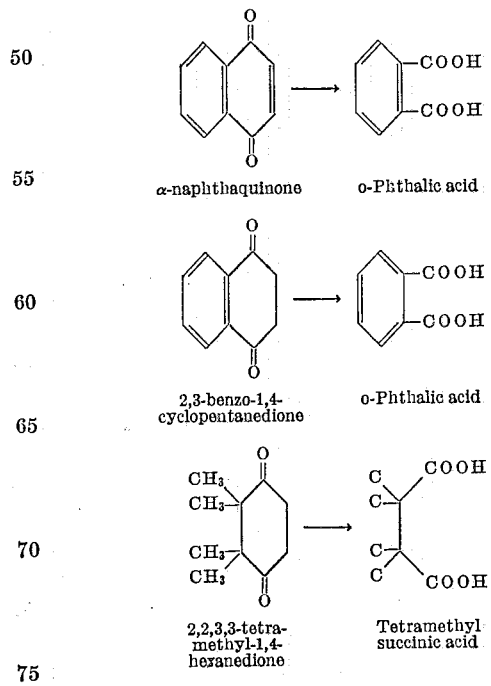

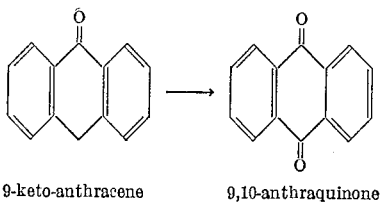

9-keto-anthracene → 9,10-anthraquinone

Steroidal Ketones:

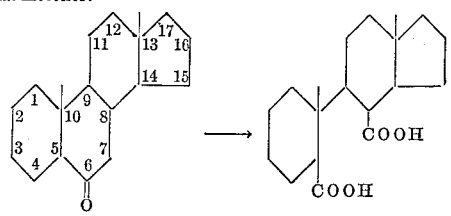

More generally, any steroid containing a keto group at the 1, 2, 3, 4, 6, 7, 11, 12, 15 or 16th carbon atom may be oxidized to its corresponding dibasic acid.

The nature and advantages of this inventioin are further exemplified by the following examples showing preferred embodiments of the invention.

*Example 1*

In this example, a number of experiments were conducted employing cyclopentanone, cyclohexanone and cycloheptanone as the cyclic ketone. In each experiment 0.025 mole of ketone was reacted with 0.15 mole of a specific base with 75 ml. of hexamethyl phosphoramide at temperatures ranging from 23 to 80° C. One atmosphere pressure of oxygen was employed in all experiments.

In the actual procedure, HMPA was purified by vacuum distillation over 13–X molecular sieves, the base was added to the dipolar solvent in a nitrogen dry-box, the ketone was then added, the system purged with oxygen and the reaction initiated by stirring at 1300 r.p.m. When oxygen consumption was complete, the reaction mixture was homogenized with water, the homogeneous mixture was passed over an Amberlite LA-Z ion exchange resin (5 volume percent in $CCl_4$) to convert the acid salts to their free acid form. The acids were further characterized by their infrared spectra and melting points which were identical to authentic samples of the acids.

The results obtained in these experiments are summarized in the following table:

TABLE I

| Ketone | Temp. | Base | Acid (Percent Yield) | Percent Selectivity to Acid |
|---|---|---|---|---|
| C5 | 80 | NaOMe | Glutaric (104) | ~100 |
| C5 | 23 | NaOMe | Glutaric (92) | 92 |
| C6 | 80 | KOtBu | Adipic | ~100 |
| C6 | 23 | NaOMe | Adipic (~100) | ~100 |
| C7 | 23 | NaOMe | Pimelic (41) | 41 |

It will be noted that in the case of the $C_5$ and $C_6$ cyclic ketones, high yields and excellent selectivity to glutaric and adipic acids were obtained. However, in the oxidation of the cycloheptanone, the pimelic acid product was obtained in substantially lower yields and lower selectivity, indicating that the higher cyclic ketones are more difficult to oxidize.

*Example 2*

Additional experiments were conducted to determine feasibility of using the inexpensive base, sodium hydroxide. In these experiments, .025 mole of cyclohexanone was reacted with 0.15 mole of sodium hydroxide with 75 ml. of hexamethylphosphoramide and 5 ml. of water under one atmosphere of oxygen, using the procedure described in Example 1. The small amount of water was employed to solubilize the sodium hydroxide to some extent. The results obtained in these experiments are summarized in Table II.

TABLE II

| Adipic Acid (Mole, Percent Yield) | Temp., ° C. | Reaction Time (hrs.) |
|---|---|---|
| 82 | 80 | 68 |
| 88 | 80 | 18 |
| 94 | 23 | 68 |
| 81 | 23 | 24 |

It will be noted that adipic acid was obtained in these oxidation experiments at relatively high yields under the conditions of time and temperature employed. It is notable that some solvent degradation occurred, presumably due to oxidation of hexamethylphosphoramide by hydroperoxides which may be formed as transient intermediates.

*Example 3*

Additional experiments were conducted in which a $C_{12}$ cyclic ketone, cyclododecanone, was oxidized to dodecanedioic acid. In these experiments, 0.0025 mole of cyclododecanone was reacted with 0.15 mole of sodium hydroxide using 75 ml. of hexamethylphosphoramide as a solvent with 5 ml. of water to solubilize the sodium hydroxide and using the procedure of Example 1. Yields of dodecanedioic acid of 40 and 48% were obtained at room temperature and 80° respectively. Again, in these experiments, it was found that some solvent oxidation occurred and, in addition, that polymeric material was formed, probably as a result of an aldol-type polymerization.

*Example 4*

Using a molten mixture consisting of 12 g. of sodium hydroxide in 16 g. of diphenyl sulfoxide, 1.23 g. of cyclohexanone were oxidized at 100° C. under one atmosphere pressure of oxygen for 22 hours. The yield of adipic acid under these conditions was 70%.

What is claimed is:

1. The conversion of cyclic ketones to carboxylic acids which comprises contacting a cyclic ketone having 4 to 20 carbon atoms with a base-solvent system wherein said solvent is an aprotic, non-hydroxylic liquid solvent having a dielectric constant of at least 15 at 25° C., a dipolar phosphoryl radical and is selected from the group consisting of hexamethylphosphoramide, tri(ethylene amide) phosphoramide, triphenyl phosphine oxide, and hypophosphite esters, said solvent being further characterized in that said dipolar radical and atoms adjacent to said dipolar radical are hydrogen-free, and recovering a dicarboxylic acid product.

2. The process for oxidizing a cyclic $C_4$ to $C_{20}$ ketone to a dicarboxylic acid in which the said cyclic ketone is oxidized with oxygen and a basic compound in the presence of an aprotic, non-hydroxylic liquid solvent having a dielectric constant of at least 15 at 25° C., a dipolar phosphoryl radical and is selected from the group consisting of hexamethylphosphoramide, tri(ethylene amide) phosphoramide, triphenyl phosphine oxide, (and hypophosphite esters, said solvent being further characterized in that said dipolar radical and atoms adjacent to said dipolar radical are hydrogen-free, and recovering a dicarboxylic acid product.

3. The process defined by claim 2 in which the said ketone is cyclopentanone.

4. The process defined by claim 2 in which the said ketone is cycloheptanone.

5. The process defined by claim 2 in which the said ketone is cyclohexanone.

6. The process defined by claim 2 in which the said ketone is cyclododecanone.

7. The process defined by claim 2 in which said solvent is hexamethylphosphoramide.

References Cited

UNITED STATES PATENTS 3,213,155  10/1965  Schriesheim et al. ____ 260—515

OTHER REFERENCES

Allen: Chemical Reviews, vol. 62 (1962), pp. 661–664.

Corey et al. Journal of the American Chemical Society, vol. 84, pp. 866–868 (March 1962).

Cram et al.: Journal of the American Chemical Society, vol. 82, pp. 6412–6413 (1960).

Hoch: Journal of Organic Chemistry, vol. 26, pp. 2066–2072 (1961).

LORRAINE A. WEINBERGER, *Primary Examiner.*

I. R. PELLMAN, V. GARNER, *Assistant Examiners.*